United States Patent [19]

Schuster et al.

[11] 4,007,303
[45] Feb. 8, 1977

[54] METHOD OF MAKING PINTLE WIRE FOR HIGH LOAD HINGE CONNECTIONS

[75] Inventors: Wilhelm Schuster, Frankfurt; Klaus Wollmann, Eschhofen; Jürgen Stahl, Frankfurt, all of Germany

[73] Assignee: Fitztuchverwaltungs-Gesellschaft mit beschrankter Haftung, Frankfurt, Germany

[22] Filed: Aug. 12, 1974

[21] Appl. No.: 496,910

Related U.S. Application Data

[62] Division of Ser. No. 192,008, Oct. 26, 1971, abandoned.

[30] Foreign Application Priority Data

Oct. 30, 1970  Germany .......................... 2053273

[52] U.S. Cl. .................................. 427/296; 16/168; 16/176; 139/383 A; 245/10; 427/177; 427/307; 427/358; 427/430 R
[51] Int. Cl.² ...................... B05D 1/18; B05D 3/00
[58] Field of Search ................. 245/10; 139/383 A; 16/163, 168, 176; 117/98, 61, 66; 427/117, 118, 120, 296, 358, 356, 307, 430 R

[56] References Cited

UNITED STATES PATENTS

| | | | |
|---|---|---|---|
| 1,157,694 | 10/1915 | Hungerford | 427/358 |
| 2,531,156 | 11/1950 | Piercy et al. | 117/61 |
| 3,384,505 | 5/1968 | Palmer et al. | 117/61 |

FOREIGN PATENTS OR APPLICATIONS

| | | | |
|---|---|---|---|
| 997,354 | 7/1965 | United Kingdom | 87/1 |

*Primary Examiner*—John H. Newsome
*Attorney, Agent, or Firm*—Walter Becker

[57] ABSTRACT

A pintle wire for high load hinge connections, especially for textile webs and transmission belts, and method of making same, according to which endless synthetic fibers are braided individually or in strands and are embedded in high wear resistant and hydrolysis resistant heat hardenable material and interconnected thereby.

6 Claims, 5 Drawing Figures

U.S. Patent    Feb. 8, 1977    4,007,303
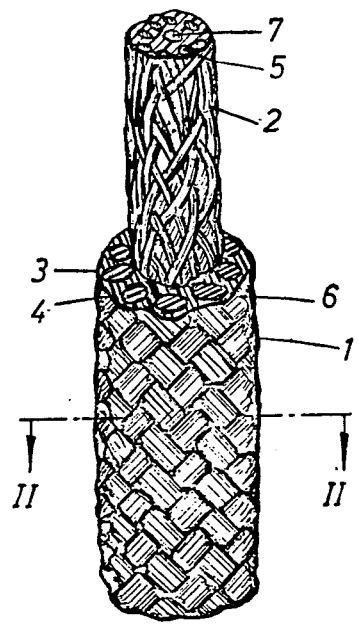
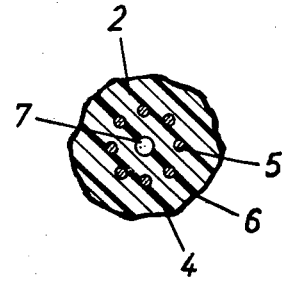
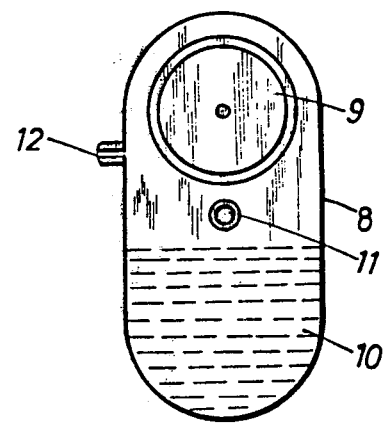
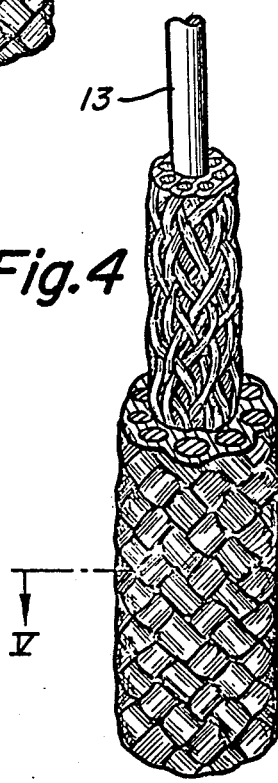
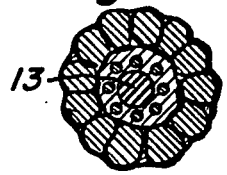

METHOD OF MAKING PINTLE WIRE FOR HIGH LOAD HINGE CONNECTIONS

This is a divisional of co-pending application Ser. No. 192,008 Schuster et al., filed Oct. 26, 1971, which was abandoned after filing of a continuation application Ser. No. 493,980 Schuster et al., filed Aug. 1, 1974.

The present invention relates to a pintle wire for high load hinge connections for textile web structures, transmission belts, or the like, and also concerns a method of producing such pintle wires. By means of such hinge connections, for instance, textile webs, such as drying felts and screens for paper machines, belts for power transmissions, and the like, are connected to form endless belts.

Multilayer connecting bolts or pintle wires are known which comprise a high wear resistant core of synthetic material, the core being surrounded by at least one layer of wear resistant braiding of synthetic material which after having been placed on the core is covered by a resin coating.

Pintle wires of the above mentioned type, however, have the drawback that at the contact areas of the hinge elements with the braiding the outer resin coating will be damaged in the course of time and will be cut through so that a fraying of the braiding will result.

In addition to the thus reduced strength of the connecting pin at these areas, there is to be mentioned that after the cutting through of the resin coating, the fibers of the braiding as well as the core material are exposed to chemical influences. In paper making machines, the hydrolytic disintegration and the influence of the solvents, which among others are utilized for cleaning the covering, result in a rather fast destruction of the connecting pins.

It is, therefore, an object of the present invention, for purposes of overcoming the above outlined drawbacks, to develop a pintle wire which even at temperatures of from 150° to 200° C can be mechanically subjected to high loads and in addition thereto will be resistant against chemical actions, such as a hydrolytic disintegration by solvents, etc.

It is a further object of this invention so to design the pintle wire or pin that it will be sufficiently elastic to permit its removal at any time so that even after a long period of operation no interfering elevations or depressions will form on its circumference or no other permanent deformations will occur.

These and other objects and advantages of the invention will appear more clearly from the following specification in connection with the accompanying drawings, in which:

FIG. 1 is a perspective view of a pintle wire according to the invention with partially removed outer core.

FIG. 2 is a section taken along the line II—II of FIG. 1.

FIG. 3 diagrammatically illustrates an impregnating and evacuating container for use in connection with the method according to the invention.

FIG. 4 is a perspective view of a modified pintle wire according to the invention.

FIG. 5 is a section taken along the line V—V of FIG. 4.

The problems underlying the present invention have been solved by designing the pintle wire of synthetic fibers, preferably endless synthetic fibers, which are braided individually or in strands and which are completely embedded in a high wear resistant and hydrolysis resistant heat hardenable synthetic material and by said material are connected to each other.

The pintle wire or pin thus consists of a wear resistant heat hardenable synthetic material which is resistant against chemical actions, especially hydrolysis, and which is armed by a skeleton of interwoven synthetic fibers. In contrast to heretofore known wires or bolts, the various properties, such as high strength, temperature stability, chemical stability, etc., are not obtained by a multilayer construction, but are obtained by a practically homogeneous structure of a wire consisting of armed heat hardenable synthetic material. When the cross section of the wire is reduced or weakened, for instance, by damage to the surface thereof, a fraying and thereby an exposure of the synthetic fibers sensitive to chemical influences will be avoided. On the other hand, by the embedding of the braiding, high mechanical strength, elasticity, the ability of retaining its shape, and, in view of the heat hardenable synthetic material, a high wear resistance of the pintle wire will be assured.

In conformity with the present invention, the synthetic fibers may have the shape of round braided hoses arranged coaxially one inside the other which hoses are interconnected by the heat hardenable synthetic material. In this connection it has proven particularly advantageous to provide two such coaxial hoses and to design the synthetic fibers of the inner hose so that they have a diameter of about ten to twenty times the diameter of the synthetic fibers of the outer hose.

Although generally an axial hollow chamber, as it is formed, for instance, with a pintle wire composed of two permeated coaxial hoses, is advantageous for the elasticity of the pintle wire, it may be favorable, particularly with very thin wires, to insert a core of monofil steel wire or of multifil steel wire in order, among other advantages, to increase the bending strength of long wires. The core may, in order to strengthen the connection between the core and the embedded material, be provided with a material aiding in such connection or adhesion.

Synthetic fibers employed for the pintle wire or pin according to the invention may consist of polyesters and/or polyamides, especially modified polyethyleneglycoltherephthalate, and a polyamide known in the trade as polyamide 66.

In many instances it is advantageous to add to the heat hardenable synthetic material lubricants, such as finely distributed polytetrafluoroethylene. This is advantageous, for instance, when a plurality of parallel pintle pins or connecting bolts are inserted into the hinge.

The present invention furthermore concerns a method of producing pintle wires as set forth above, which method is characterized primarily in that a preferably hose-shaped multilayer skeleton of braided synthetic fibers is first desized by means of a solvent, is subsequently dried, and then introduced into a container in which locally separated from the synthetic fibers there is contained an impregnating fluid which after removal of its solvent and after hardening forms a heat hardenable synthetic material. The method according to the invention is furthermore characterized in that the container is evacuated and subsequently the synthetic fibers within the container are immersed in the permeating fluid whereupon by means of a water-free gas an over-pressure of from 5 to 10 atmospheres above atmospheric pressure is produced in the container and maintained for a number of hours. After pressure equalization has occurred in the container, the impregnated synthetic fibers are through a calibrated nozzle withdrawn from the container and through a passage heated up to a temperature of from 50° C to 100° C are for purposes of hardening the heat hardenable synthetic material wound onto a drum provided with profiled rollers.

According to a particularly advantageous way of practicing the method according to the invention, it is suggested to apply wetting agents, preferably fluor chemicals, to the surface of the braided synthetic fibers prior to their immersion into the impregnating fluid. As fluor chemicals, perfluorocarbonic acid and perfluorosulfonic acid may be employed. Such wetting agent may be added, for instance, to the solvent for desizing the braided synthetic fibers while the wetting agent must after the drying step remain at least partially on the synthetic fibers.

In conformity with the present invention, a wetting agent, for instance, likewise a fluor compound, may be added to the impregnating fluid.

In order to increase the length stability of the pintle wire, it is advantageous to expose the pin or wire after the hardening of the heat hardenable synthetic material to a heat treatment of approximately 150° C for a number of hours.

Referring now to the drawing in detail, the insert wire or pin as illustrated in FIG. 1 comprises two round braided coaxial hoses 5 and 6 of synthetic fibers of different thicknesses. Whereas the strands 1 braided to form the outer hose 6 are composed of numerous thin synthetic fibers 3 (see FIG. 2), the braiding of the inner hose 5 is formed by monofil synthetic fibers 2 the diameter of which, according to a particularly advantageous design of the invention, corresponds approximately to ten times the diameter of the synthetic fibers 3 of the outer hose 6. By a suitable selection of the thickness of the fibers and the type and density of the braiding, the absorbed quantity of heat hardenable synthetic material as well as the elasticity and loadability of the pintle wire can be adapted to the respective specific requirements while taking into consideration the different loadability at the surface and in the interior of the wire by different fiber materials and different fiber thicknesses for the inner and outer braiding.

The different structure of the braiding in the exterior and the interior of the wire is particularly clearly shown in the cross section of FIG. 2. In the interstices between the relatively thick synthetic fibers 2 and also between the fine synthetic fibers 3 of each strand 1 and in the meshes formed by these strands 1, furthermore between the inner and the outer hoses 5, 6 and finally over the circumference of the outer hose 6 there is provided a high wear resistant and hydrolysis resistant heat hardenable synthetic material 4 which in specific instances may contain a lubricant, such as polytetrafluoroethylene.

The inner hose 5 generally surrounds an axial hollow chamber 7 into which, inherent to the method according to the invention, more or less heat hardenable synthetic material 4 may enter.

According to a modified embodiment of the invention shown in FIGS. 4 and 5, in the interior of the pintle wire there may be provided a core 13 of monofil steel wire or of multifil steel wire which core is surrounded by one or more hoses of braided synthetic fibers permeated with heat hardenable synthetic material. This design is particularly advantageous when very fine wires are necessary or required.

In connection with the production of a pintle wire according to the present invention it may sometimes be difficult so to insert the heat hardenable synthetic material 4 into the skeleton of synthetic fibers 2, 3 that actually each fiber will be embedded in the synthetic material 4 and will be connected to the other fibers. In order to assure such structure, it is suggested for purposes of making the pintle wire according to FIGS. 1 and 2, 4 and 5, first to braid the two hoses 5 and 6 one upon the other and subsequently to desize these fibers, which may consist of polyesters or polyamides, by means of a standard solvent or a mixture of solvents, and then to dry the same. Such solvent mixture may consist for instance of 70% xylol and 30% ethyleneglycol acetate. Subsequently, this skeleton wound upon a drum 9 and consisting of the braided synthetic fibers 2 and 3 is introduced into a container 8 (see FIG. 3) in which locally separated from the drum 9 there is provided a permeating fluid 10 which by removal of its solvent and by hardening is converted into a heat hardenable synthetic material. The entire container 8 is after the insertion of the drum 9 with the fibers wound thereupon first evacuated and subsequently, while maintaining the vacuum, is pivoted about the central shaft 11 so that the drum 9 with the synthetic fibers 2, 3 wound thereon will immerse into the permeating fluid 10. In this way it will be assured that the permeating fluid 10 will as completely as possible enter into the interstices between the synthetic fibers 2, 3. This may be further aided by the addition of a wetting agent, such as a fluor compound, into the fluid 10. It is also possible already during the desizing operation or subsequently thereto to apply a wetting agent to the surface of the synthetic fibers.

In order to assure that the permeating fluid and thereby the heat hardenable synthetic material formed therefrom will also enter into the narrowest interstices between the fine synthetic fibers, an over-pressure of approximately from 5 to 10 atmospheres above atmospheric pressure is produced by means of a water-free gas in the tilted container 8, i.e. while the drum 9 is in the permeating fluid, the over-pressure being maintained for a number of hours, e.g. two hours. Subsequently, the now permeated skeleton formed by the braided synthetic fibers 2 and 3 may through a calibrated nozzle 12 be pulled out of the container 8 and may be introduced directly into a heating passage in which the removal of the solvent and the hardening of the heat hardenable synthetic material begins. Finally, the pintle wire or pin is wound upon a drum and is introduced into corresponding profiled grooves which during the final hardening of the heat hardenable synthetic material will prevent the windings from sticking to each other.

For purposes of improving the length stability of such pintle wires or in order to prevent that the pintle wires will in response to an increase in temperature during the operation be shortened in a non-controllable manner, the pintle wire according to the invention may, following the hardening of the heat hardenable synthetic material, be exposed for a number of hours, e.g. two hours, to a temperature of approximately 150° C.

EXAMPLE

A polyester yarn of endless fibers is braided around a hoseshaped braided cord or strand of monofil polyester wires so that a cord or strand will be formed having a diameter of 2 millimeters. This cord or strand is with a desired length wound upon a preparing reel. It is on this reel that the cord or strand is cleaned by washing with trichloroethylene to which latter compound 0.2% of perfluorcarbon have been added. Subsequently, the reel is inserted into a drying chamber having a temperature of 70° C, and the solvent is removed. The perfluorcarbonic acid components dissolved in the solvent remain on the material.

The reel is then rotatably mounted in the upper part of the impregnating autoclave. The start of the cord or strand is passed through a pull nozzle and knotted at this place, and said nozzle is closed with a sealed stopper.

The impregnating liquid is filled into the lower portion of the autoclave, said impregnating liquid consisting of:

38% of modified polyethyleneglycoltherephthalate
42% of Xylol
18% of ethylglycolacetate
1.5% of PTFE-powder
0.5% of dye pigment.

The upper portion of the autoclave which contains the reel with the cord or strand is now placed upon the lower portion of the autoclave and tightly screwed thereonto. Subsequently, the air is pumped out of the autoclave by means of a vacuum pump. After a two-hour evacuating period a pressure of approximately 15 Torr is obtained. After this vacuum has been established, the autoclave is turned by 180° so that the cord or strand reel is now in the lower portion of the autoclave and is covered by the preparing liquid. The vacuum pump remains connected to the autoclave for another hour. Subsequently, by closing the vacuum conduit and opening the pressure line, air is admitted to the autoclave until in the autoclave a pressure of 6 atmospheres above atmospheric pressure has been established. This pressure is maintained for two hours, whereupon the pressure line is closed and the air is slowly discharged by opening a vent.

The closure cap above the nozzle may now be screwed off. The impregnated wire or cord is now pulled out of the autoclave through a calibrated nozzle and is passed through a drying passage and is connected to the winding drum. By turning on the drive for the drum, the cord is at low speed of one meter per minute passed through the drying passage heated to 90° C and is subsequently wound into the profiled grooves of the winding drum. After the entire cord quantity has been drawn off, the winding drum is heated for four hours to a temperature of 50° C in order to completely remove the solvent from the wire.

Following the cooling off of the winding drum, the wire is wound off and condensation of the polyester is effected for two hours in the drying chamber at a temperature of 150° C.

The present invention also covers a pintle wire which excels primarily by its resistance against chemical influences, its high mechanical loadability or strength and by its temperature resistance and its elasticity. These properties are maintained in view of the practically homogeneous construction of the pintle wire according to the invention, even when the surface of such wire is damaged.

It is, of course, to be understood that the present invention is, by no means, limited to the particular showing in the drawings and the method set forth above, but also comprises any modifications within the scope of the appended claims.

What we claim is:

1. A method of producing a pintle wire for hinge connections, especially for textile webs and transmission belts, which includes in combination the steps of: building up a multi-layer skeleton of braided synthetic fibers in the form of a hose, desizing the thus built-up skeleton by means of a solvent, drying the thus desized skeleton of braided synthetic fibers, introducing into a lower portion of a container a permeating solution adapted after removal of its solvent and after hardening to form a heat hardenable synthetic material, introducing the multi-layer skeleton of braided synthetic fibers into the container above the solution, thereupon evacuating said container with the skeleton of fibers above the solution, thereby first removing any gaseous components and air from said skeleton of fibers and also from said solution prior to dipping said skeleton of fibers into the permeating solution, subsequently while in the evacuated container immersing said synthetic fibers into said immersing solution, thereupon by means of a water-free gas above said solution producing an overpressure of from 5 to 10 atmospheres above atmospheric pressure in said container, maintaining said last mentioned pressure for a number of hours, after pressure equalization has occurred in said container withdrawing the impregnated synthetic fibers from said container through a calibrated nozzle and through a heating zone having a temperature of from 50° to 100° C. for hardening the heat hardenable synthetic material, and winding up the thus produced synthetic fibers on reel means.

2. A method in combination according to claim 1, which includes the step of applying a wetting agent to the surface of the braided synthetic fiber means prior to immersing the same into the permeating solution.

3. A method in combination according to claim 2, in which said wetting agent is a fluor chemical compound.

4. A method in combination according to claim 3, which includes the step of adding a wetting agent to the solvent for desizing said skeleton of braided synthetic fibers so that after the drying step at least a portion of said wetting agent remains on said synthetic fibers.

5. A method in combination according to claim 3, which includes the step of adding a wetting agent to said permeating solution.

6. A method in combination according to claim 3, which includes the step of following the hardening of the heat hardenable synthetic material subjecting the pintle wire for a number of hours to a temperature of approximately 150° C.

* * * * *

UNITED STATES PATENT OFFICE
CERTIFICATE OF CORRECTION

Patent No. 4,007,303  Dated February 8, 1977

Inventor(s) Wilhelm Schuster et al.

It is certified that error appears in the above-identified patent and that said Letters Patent are hereby corrected as shown below:

On the cover sheet Item (73) Assignee should read :

-- Filztuchverwaltungs-Gesellschaft mit beschränkter Haftung, Frankfurt, Germany --.

Signed and Sealed this

Fifteenth Day of November 1977

[SEAL]

Attest:

RUTH C. MASON
Attesting Officer

LUTRELLE F. PARKER
Acting Commissioner of Patents and Trademarks